US012352023B1

(12) United States Patent
Yan

(10) Patent No.: US 12,352,023 B1
(45) Date of Patent: Jul. 8, 2025

(54) TWO-IN-ONE BATHROOM SUPPORT ARM

(71) Applicant: XIAMEN GALENPOO KITCHEN & BATHROOM TECHNOLOGY CO., LTD, Xiamen (CN)

(72) Inventor: Xiaoling Yan, Xiamen (CN)

(73) Assignee: XIAMEN GALENPOO KITCHEN & BATHROOM TECHNOLOGY CO., LTD, Xiamen (CN)

( * ) Notice: Subject to any disclaimer, the term of this patent is extended or adjusted under 35 U.S.C. 154(b) by 0 days.

(21) Appl. No.: 18/963,239

(22) Filed: Nov. 27, 2024

(51) Int. Cl.
*E03C 1/04* (2006.01)
*B05B 1/18* (2006.01)

(52) U.S. Cl.
CPC ............ *E03C 1/0409* (2013.01); *B05B 1/185* (2013.01)

(58) Field of Classification Search
CPC .... E03C 1/0404; E03C 1/0405; E03C 1/0415; E03C 1/0408; E03C 1/0409; E03C 2001/0417; B05B 1/185; B05B 1/20; B05B 1/205; B05B 11/0094
USPC ..................................... 4/567–570, 601, 615
See application file for complete search history.

(56) References Cited

U.S. PATENT DOCUMENTS

2002/0035752 A1* 3/2002 Gransow ............... E03C 1/0408 4/601
2021/0178410 A1* 6/2021 Davies .................. E03C 1/0408
2023/0175241 A1* 6/2023 Shade ................... E03C 1/0408 239/536

FOREIGN PATENT DOCUMENTS

CN 201537035 U 8/2010
CN 221095324 U 6/2024
CN 221219000 U 6/2024

* cited by examiner

*Primary Examiner* — Tuan N Nguyen
(74) *Attorney, Agent, or Firm* — George D. Morgan

(57) ABSTRACT

The present invention discloses a two-in-one bathroom support arm, and a top sprayer end and a shower end can be adjusted separately and flexibly. The support arm includes an installing base, a first support arm, a second support arm, and a water path adjusting part, where the installing base is provided with a rotating shaft, a water flowing chamber, and a water inlet; the water inlet communicates with the water flowing chamber; a circumferential surface of the rotating shaft is provided with a water flowing sink that communicates with the water flowing chamber; and pivot ends of the first support arm and the second support arm are respectively provided with a first pivot ring and a second pivot ring that are pivoted on the rotating shaft, at least one of the support arms is provided with a connection opening that communicates with the rotating shaft.

10 Claims, 5 Drawing Sheets

TWO-IN-ONE BATHROOM SUPPORT ARM

TECHNICAL FIELD

The present invention relates to the technical field of bathroom devices, and in particular to a two-in-one bathroom support arm.

BACKGROUND

A water inlet end of a bathroom support arm is usually docked with a water pipe joint embedded in a wall, and a water outlet end is installed with a top sprayer, which is simple in structure and can extend an installation range of the top sprayer.

With the continuous change of market demands, a manufacturer has also made further improvements to a structure of the bathroom support arm, such as adding a tee joint, to implement the installation of both the top sprayer and a shower on the bathroom support arm, and a user does not need to install a shower rod, reducing the occupation of wall space.

The existing two-in-one bathroom support arm is usually integral and is configured to fasten the top sprayer and the shower, so that the support arm can rotate relative to the water inlet end, to adjust a range, but a top sprayer end and a shower end can only be adjusted synchronously, which is adjusted inflexibly and cannot be folded during packaging and transportation, and occupies large space.

SUMMARY

The present invention is intended to provide a two-in-one bathroom support arm, to resolve a problem existing in the prior art, so that a top sprayer end and a shower end of the bathroom support arm can be adjusted separately and more flexibly.

To achieve the foregoing purpose, technical solutions of the present invention are as follows:

a two-in-one bathroom support arm, including an installing base, a first support arm, a second support arm, and a water path adjusting part, where the installing base is provided with a rotating shaft, a water flowing chamber, and a water inlet; the water inlet communicates with the water flowing chamber; a circumferential surface of the rotating shaft is provided with a water flowing sink, and the water flowing sink communicates with the water flowing chamber; and pivot ends of the first support arm and the second support arm are respectively provided with a first pivot ring and a second pivot ring that are pivoted and matched on the rotating shaft, at least one of the first support arm and the second support arm is provided with a connection opening that communicates with the rotating shaft, and a movable end of one of the first support arm and the second support arm is provided with a shower fastening base; and the water path adjusting part is dynamically and sealably installed in the installing base and is configured to adjust a water path communication relationship.

a movable end of the first support arm is provided with a top sprayer connection opening, the top sprayer connection opening communicates with the water flowing chamber through the rotating shaft, and a movable end of the second support arm is provided with the shower fastening base; the water path adjusting part is provided with a shower connection opening; and a user controls on/off between the water inlet, the top sprayer connection opening, and the shower connection opening by operating the water path adjusting part.

Preferably, the first pivot ring is provided with a water flowing hole, and the water flowing hole communicates with the top sprayer connection opening; and the first pivot ring dynamically seals the water flowing sink, so that the water flowing chamber communicates with the top sprayer connection opening through the water flowing sink and the water flowing hole.

Preferably, the rotating shaft extends to two sides of the installing base, and the pivot ends of the first support arm and the second support arm are respectively provided with a pair of first pivot rings and a pair of second pivot rings.

Preferably, a circumferential surface of one end of the rotating shaft is provided with the water flowing sink, a damping part is installed on a circumferential surface of the other end, and the damping part is matched with positioning convex teeth respectively disposed in the corresponding first pivot ring and second pivot ring.

Preferably, one of the first support arm and the second support arm is provided with a storage chamber that matches an appearance of the other support arm.

Preferably, the water path adjusting part is rotatably matched in the installing base, two sides of a circumferential surface of one end of the water path adjusting part are respectively provided with a communication opening and a communication groove, an end face of the other end of the water path adjusting part is provided with the shower connection opening, and the communication opening communicates with the shower connection opening; and when the water path adjusting part is rotated, at least one of the communication opening and the communication groove is opposite to the water inlet to communicate with the water inlet, and when the communication groove is opposite to the water inlet, the water inlet communicates with the top sprayer connection opening.

Preferably, a valve body with one inlet and two outlets is disposed in the water flowing chamber, a water inlet end and one water outlet end of the valve body respectively communicate with the water inlet and the top sprayer connection opening, and the water path adjusting part is dynamically and sealably rotated to match the other water outlet end of the valve body.

Preferably, a limiting groove is disposed around a circumferential surface of the water path adjusting part, a limiting pin is installed in the valve body, one end of the limiting pin is fastened to the valve body, and the other end is movably matched in the limiting groove.

Preferably, a circumferential surface of the water path adjusting part is provided with a toggle.

After the foregoing technical solutions are used, the present invention has the following beneficial effects.

1) The first support arm and the second support arm are both separately pivoted and matched on the rotating shaft of the installing base, to implement separate angle adjustment, and water spray angles can be adjusted extremely widely for the top sprayer and the shower in actual product application, to meet the user's various application needs.
2) Through the water path adjusting part in the installing base, an on/off state and a flow size between the water inlet and the connection opening can be flexibly switched, so that the support arm is used more flexibly.
3) After the first support arm and the second support arm are folded in opposite directions, space occupied by the bathroom support arm can be greatly reduced, especially an overall length is shortened, reducing packaging volume and transportation and storage costs.

DESCRIPTION OF REFERENCE NUMERALS

Figure 1:
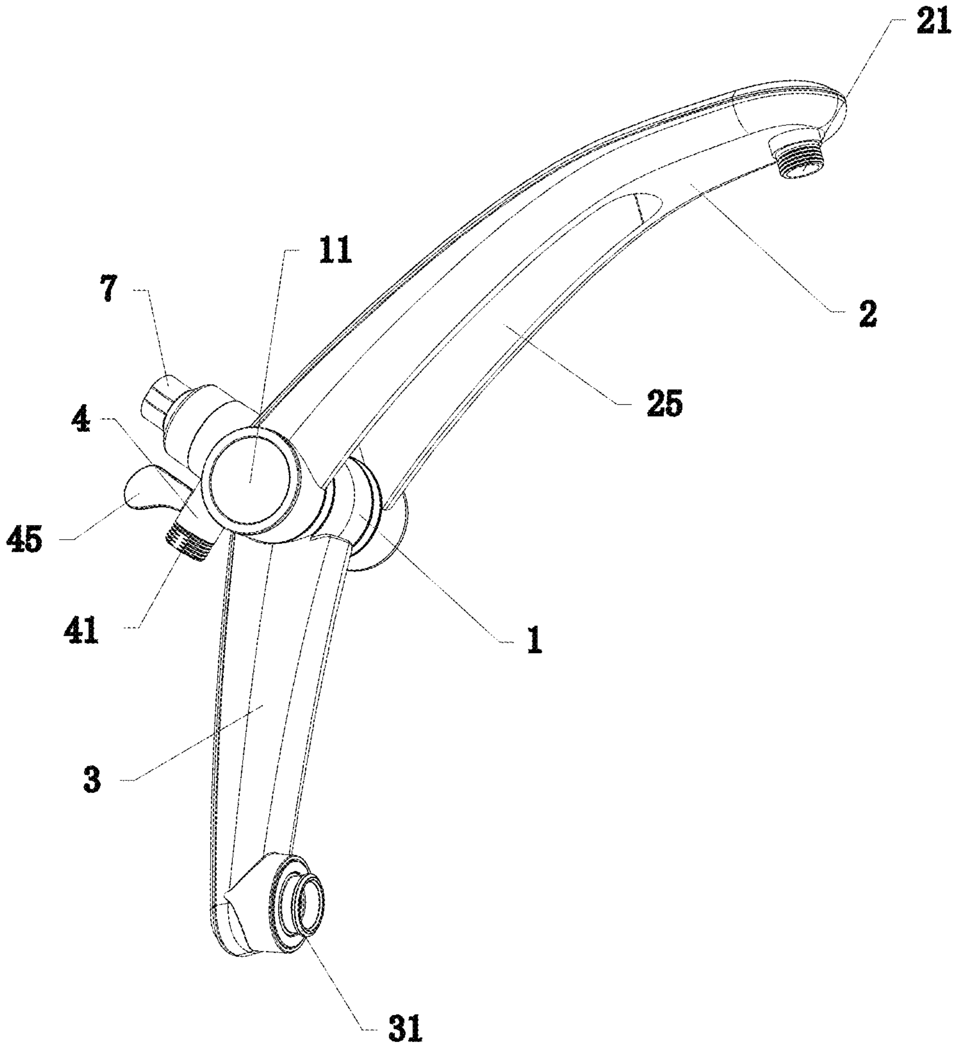
FIG. 1 is a three-dimensional view of the present invention in an unfolded state according to a first embodiment.

1—installing base; 11—rotating shaft; 12—water flowing chamber; 13—water inlet; 14—water flowing sink; 15—damping part;

2—first support arm; 21—top sprayer connection opening; 22—first pivot ring; 23—water flowing hole; 24—positioning convex tooth; 25—storage chamber;

3—second support arm; 31, 31'—shower fastening base; 32—second pivot ring; 33—positioning convex tooth;

4—water path adjusting part; 41—shower connection opening; 42—communication opening; 43—communication groove; 44—limiting groove; 45—toggle;

5—valve body;

6—limiting pin;

7—water inlet joint;

8—adapter cover;

9—fastening bolt.

DETAILED DESCRIPTION OF THE EMBODIMENTS

To further explain technical solutions of the present invention, the present invention is described in detail below in specific embodiments.

With reference to FIG. 1 to FIG. 5, the present invention discloses a two-in-one bathroom support arm, including an installing base 1, a first support arm 2, a second support arm 3, and a water path adjusting part 4.

The installing base 1 is provided with a rotating shaft 11, a water flowing chamber 12, and a water inlet 13. The water flowing chamber 12 communicates with the rotating shaft 11 and the water inlet 13 separately.

Pivot ends of the first support arm 2 and the second support arm 3 are both pivoted and matched on the rotating shaft 11. A movable end of the first support arm 2 is provided with a top sprayer connection opening 21, and the top sprayer connection opening 21 communicates with the water flowing chamber 12 through the rotating shaft 11. A movable end of the second support arm 3 is provided with a shower fastening base 31.

The water path adjusting part 4 is dynamically and sealably installed in the installing base 1, and a shower connection opening 41 is provided on the water path adjusting part. The user controls on/off between the water inlet 13, the top sprayer connection opening 21, and the shower connection opening 31 by operating the water path adjusting part 4.

Figure 2:
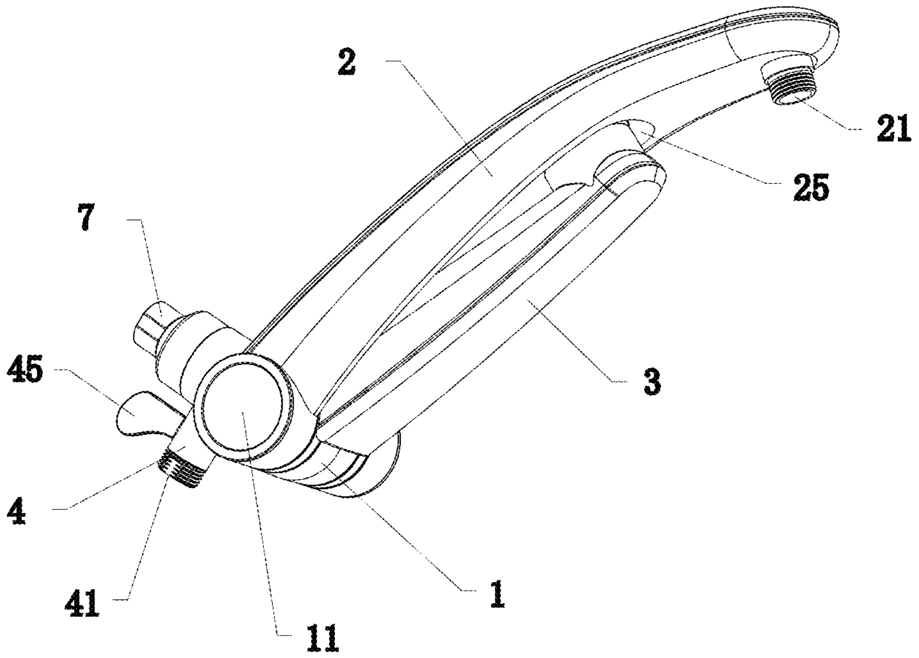
FIG. 2 is a three-dimensional view of the present invention in a folded state according to the first embodiment.
Figure 3:
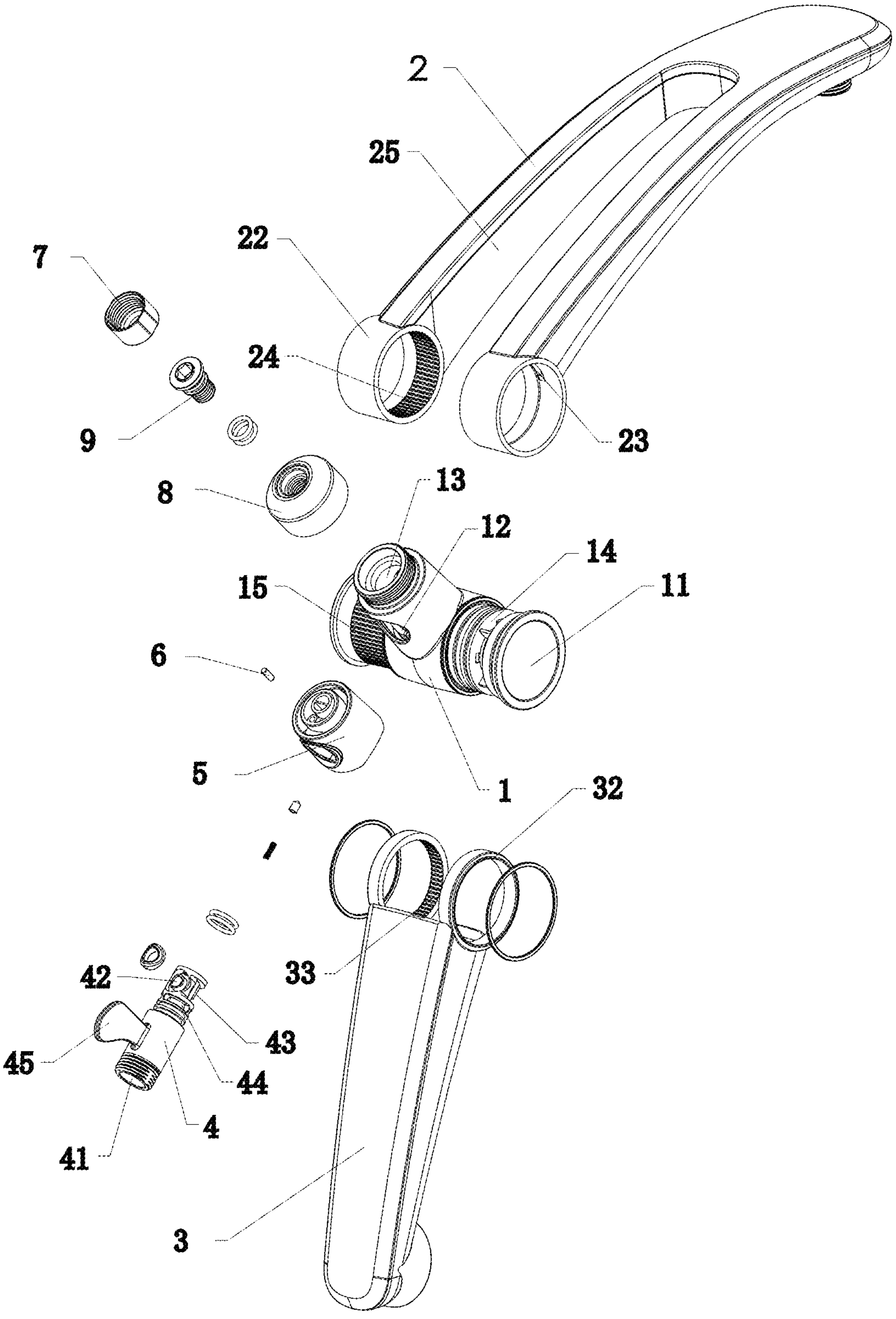
FIG. 3 is an exploded view of the present invention according to the first embodiment.
Figure 4:
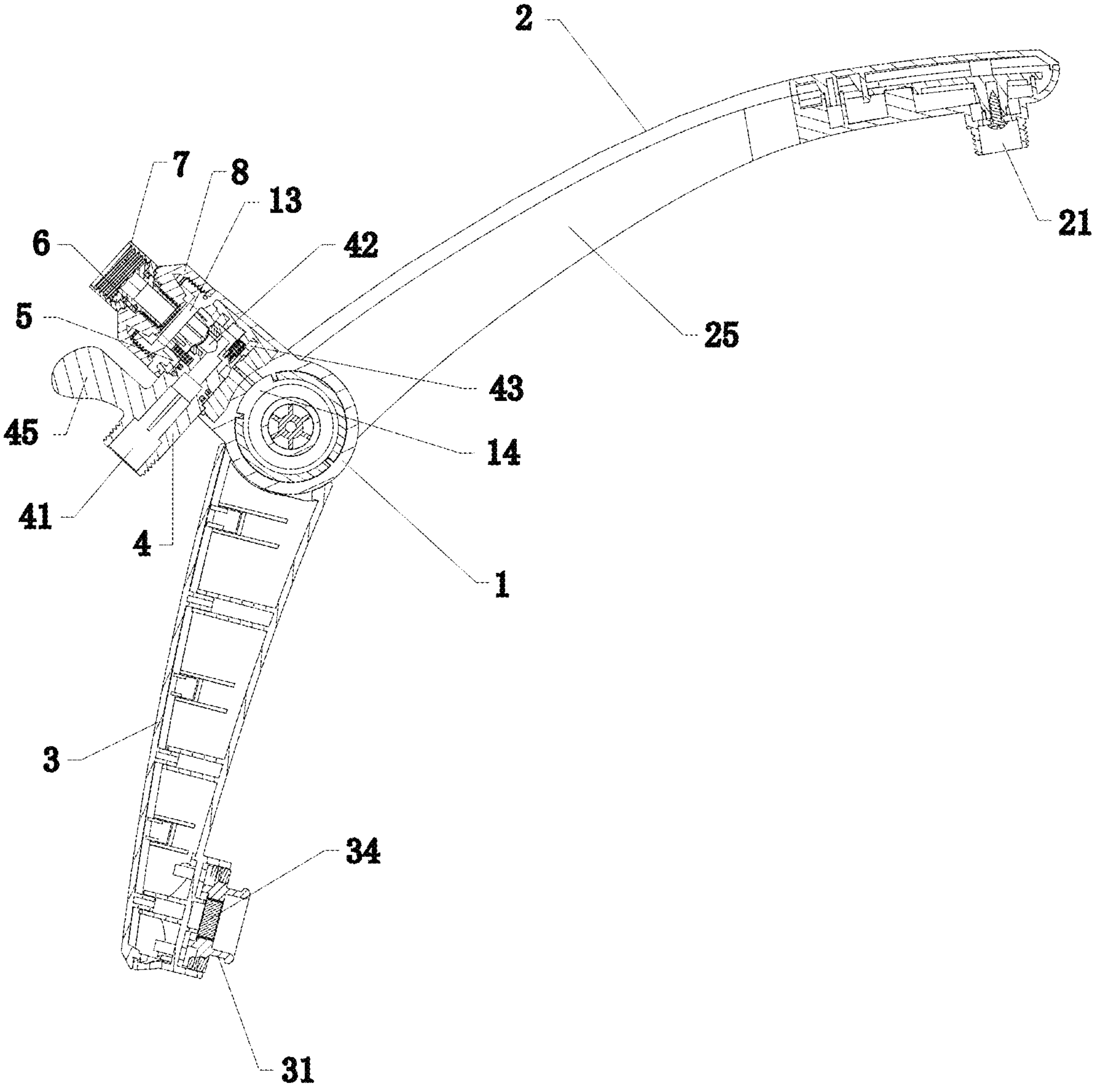
FIG. 4 is a sectional view of the present invention according to the first embodiment.

In the above solution, the first support arm 2 and the second support arm 3 of the present invention are both separately pivoted and matched on the rotating shaft 11 of the installing base 1, to implement separate angle adjustment, that is, water spray angles can be adjusted extremely widely for the top sprayer and the shower, to meet the user's various application needs. Through the water path adjusting part 4 in the installing base 1, an on/off state and a flow size between the water inlet 13, the top sprayer connection opening 21, and the shower connection opening 31 can be flexibly switched, so that both of the top sprayer and the shower are closed or at least one of the top sprayer and the shower sprays water, which are used more flexibly. Refer to FIG. 2. After the first support arm 2 and the second support arm 3 are folded in opposite directions, space occupied by the bathroom support arm can be greatly reduced, especially an overall length is shortened, reducing packaging volume and transportation and storage costs.

It can be expected that the present invention provides only one example of a plurality of combinations of connection openings disposed between the first support arm 2, the second support arm 3, and the water path adjusting part 4. However, simple movement and conversion of positions of the connection openings cannot be excluded from a protection scope of the present invention.

In some embodiments of the present invention, a circumferential surface of the rotating shaft 11 is provided with a water flowing sink 14, and the water flowing sink 14 communicates with the water flowing chamber 12. Pivot ends of the first support arm 2 and the second support arm 3 are respectively provided with a first pivot ring 22 and a second pivot ring 32. The first pivot ring 22 is provided with a water flowing hole 23, and the water flowing hole 23 communicates with the top sprayer connection opening 21. The first pivot ring 22 and the second pivot ring 32 are both sleeved on the rotating shaft 11, and the first pivot ring 22 dynamically seals the water flowing sink 14, so that the water flowing chamber 12 communicates with the top sprayer connection opening 21 through the water flowing sink 14 and the water flowing hole 23.

Further, the rotating shaft 11 extends to two sides of the installing base 1. The pivot ends of the first support arm 2 and the second support arm 3 are respectively provided with a pair of first pivot rings 22 and a pair of second pivot rings 32. Two pivot rings are rotated and matched on both sides of the installing base 1, so that an entire structure bears even stresses on the left and right and is more stable.

In addition, a circumferential surface of one end of the rotating shaft 11 is provided with the above water flowing sink 14, a damping part 15 is installed on a circumferential surface of the other end, and the damping part 15 is matched with a positioning convex tooth 24 and a positioning convex tooth 33 respectively disposed in the corresponding first pivot ring 22 and second pivot ring 32, so that angle adjustment and positioning of the first support arm 2 and the second support arm 3 are implemented. A surface of the damping part 15 can be provided with a corresponding tooth-shaped structure.

In some embodiments of the present invention, one of the first support arm 2 and the second support arm 3 is provided with a storage chamber 25 (a figure shows that the storage chamber 25 is disposed on the first support arm 2) matched with an appearance of the other support arm, so that during folding and storage, the other support arm can be stored in an arm with the storage chamber 25, and a volume after folding is further reduced.

In some embodiments of the present invention, the water path adjusting part 4 is rotatably matched in the installing base 1, two sides of a circumferential surface of one end of the water path adjusting part are respectively provided with a communication opening 42 and a communication groove 43, an end face of the other end of the water path adjusting part 4 is provided with the shower connection opening 41, and the communication opening 42 communicates with the shower connection opening 41. When the water path adjusting part 4 is rotated, at least one of the communication opening 42 and the communication groove 43 is opposite to the water inlet 13 to communicate with the water inlet. When the communication groove 43 is opposite to the water inlet 13, the water inlet 13 communicates with the top sprayer connection opening 21.

Further, a valve body 5 with one inlet and two outlets is disposed in the above water flowing chamber 12, and a water inlet end and one water outlet end of the valve body 5 respectively communicate with the water inlet 13 and the top sprayer connection opening 21 (namely, communicating with the above water flowing sink 14), and the water path adjusting part 4 is dynamically and sealably rotated to match the other water outlet end of the valve body 5.

Next, a limiting groove 44 is disposed around a circumferential surface of the above water path adjusting part 4, a limiting pin 6 is installed in the valve body 5, one end of the limiting pin 6 is fastened to the valve body 5, and the other end is movably matched in the limiting groove 44, to axially limit the water path adjusting part 4, allowing the water path adjusting part to do circular motion and not to do axial motion, preventing the water path adjusting part 4 from being loosened from the valve body 5. In addition, a rotation range of the water path adjusting part 4 can also be limited by customizing a length and arc of the limiting groove 44.

In addition, a toggle 45 is disposed around the circumferential surface of the above water path adjusting part 4, so that the user can more easily operate the water path adjusting part 4.

In some embodiments of the present invention, the present invention further includes a water inlet joint 7 that is disposed on the installing base 1 and opposite to the water inlet 13, and the water inlet joint 7 is configured to connect a water pipe joint embedded in a wall.

Further, the water inlet joint 7 is detachably installed on the installing base 1 through an adapter cover 8, the water inlet joint 7 and the adapter cover 8 are limited through a fastening bolt 9, and the fastening bolt 9 is a hollow part to implement water flowing. Therefore, the water inlet joint 7 can be removed from the installing base 1 and replaced with another water inlet connector 7 of a different size and specification, to meet the needs of different application scenarios.

FIG. 1 to FIG. 4 show a first embodiment of the present invention.

The shower fastening base 31 is a magnetic fastening base, that is, a magnet 34 is built in, and the shower is fastened by magnetic adsorption.

Figure 5:
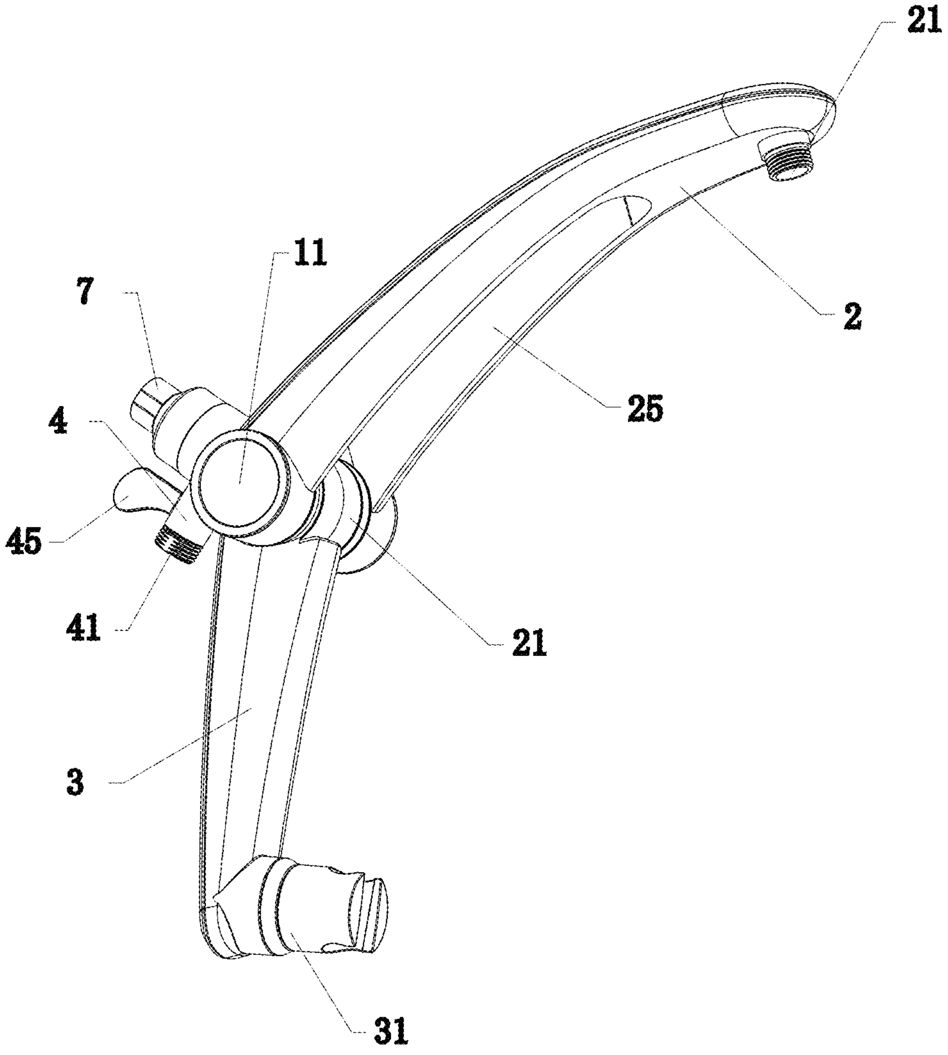
FIG. 5 is a three-dimensional view of the present invention in an unfolded state according to a second embodiment.

FIG. 5 shows a second embodiment of the present invention.

A shower fastening base 31' is a snap-fit fastening base, that is, a C-type snap-fit fastening base is disposed, and a handle of the shower is held tightly through the C-type snap-fit fastening base, to fasten the shower.

The above embodiments and drawings are not used to limit to a product form and style of the present invention, and any proper changes or modifications made by a person skilled in the art shall be deemed not to be beyond the patent scope of the present invention.

What is claimed is:

1. A two-in-one bathroom support arm, comprising an installing base, a first support arm, a second support arm, and a water path adjusting part, wherein the installing base is provided with a rotating shaft, a water flowing chamber, and a water inlet; the water inlet communicates with the water flowing chamber; a circumferential surface of the rotating shaft is provided with a water flowing sink, and the water flowing sink communicates with the water flowing chamber; and pivot ends of the first support arm and the second support arm are respectively provided with a first pivot ring and a second pivot ring that are pivoted and matched on the rotating shaft allowing an independent angle adjustment of the first arm and the second arm through the first pivot ring and the second pivot ring, at least one of the first support arm and the second support arm is provided with a connection opening that communicates with the rotating shaft, and a movable end of one of the first support arm and the second support arm is provided with a shower fastening base; and the water path adjusting part is dynamically and sealably installed in the installing base and is configured to adjust a water path communication relationship.

2. The two-in-one bathroom support arm according to claim 1, wherein a movable end of the first support arm is provided with a top sprayer connection opening, the top sprayer connection opening communicates with the water flowing chamber through the rotating shaft, and a movable end of the second support arm is provided with the shower fastening base;

the water path adjusting part is provided with a shower connection opening; and a user controls on/off between the water inlet, the top sprayer connection opening, and the shower connection opening by operating the water path adjusting part.

3. The two-in-one bathroom support arm according to claim 2, wherein the first pivot ring is provided with a water flowing hole, and the water flowing hole communicates with the top sprayer connection opening; and the first pivot ring dynamically seals the water flowing sink, so that the water flowing chamber communicates with the top sprayer connection opening through the water flowing sink and the water flowing hole.

4. The two-in-one bathroom support arm according to claim 3, wherein the rotating shaft extends to two sides of the installing base, and the pivot ends of the first support arm and the second support arm are respectively provided with a pair of first pivot rings and a pair of second pivot rings.

5. The two-in-one bathroom support arm according to claim 4, wherein a circumferential surface of one end of the rotating shaft is provided with the water flowing sink, a damping part is installed on a circumferential surface of the other end, and the damping part is matched with positioning convex teeth respectively disposed in the corresponding first pivot ring and second pivot ring.

6. The two-in-one bathroom support arm according to claim 2, wherein one of the first support arm and the second support arm is provided with a storage chamber that matches an appearance of the other support arm.

7. The two-in-one bathroom support arm according to claim 2, wherein the water path adjusting part is rotatably matched in the installing base, two sides of a circumferential surface of one end of the water path adjusting part are respectively provided with a communication opening and a communication groove, an end face of the other end of the water path adjusting part is provided with the shower connection opening, and the communication opening communicates with the shower connection opening; when the water path adjusting part is rotated, at least one of the communication opening and the communication groove is opposite to the water inlet to communicate with the water inlet, and when the communication groove is opposite to the water inlet, the water inlet communicates with the top sprayer connection opening.

8. The two-in-one bathroom support arm according to claim 7, wherein a valve body with one inlet and two outlets is disposed in the water flowing chamber, a water inlet end and one water outlet end of the valve body respectively communicate with the water inlet and the top sprayer connection opening, and the water path adjusting part is dynamically and sealably rotated to match the other water outlet end of the valve body.

9. The two-in-one bathroom support arm according to claim 8, wherein a limiting groove is disposed around a circumferential surface of the water path adjusting part, a limiting pin is installed in the valve body, one end of the limiting pin is fastened to the valve body, and the other end is movably matched in the limiting groove.

10. The two-in-one bathroom support arm according to claim 7, wherein a circumferential surface of the water path adjusting part is provided with a toggle.

* * * * *